(12) United States Patent
Busch et al.

(10) Patent No.: US 7,596,839 B2
(45) Date of Patent: Oct. 6, 2009

(54) METHOD AND DEVICE FOR LONGITUDINAL DRAWING OF A FILM WEB

(75) Inventors: Detlef Busch, Saarlouis (DE); Albrecht Freynhofer, Schiffweiler (DE); Gerhard Koch, Mandelbachtal (DE); Michael Thull, Heusweiler (DE)

(73) Assignee: Treofan Germany GmbH & Co. KG (DE)

( * ) Notice: Subject to any disclaimer, the term of this patent is extended or adjusted under 35 U.S.C. 154(b) by 520 days.

(21) Appl. No.: 10/586,383

(22) PCT Filed: Jan. 17, 2005

(86) PCT No.: PCT/EP2005/000385

§ 371 (c)(1),
(2), (4) Date: Jul. 19, 2006

(87) PCT Pub. No.: WO2005/070653

PCT Pub. Date: Aug. 4, 2005

(65) Prior Publication Data

US 2007/0157436 A1   Jul. 12, 2007

(30) Foreign Application Priority Data

Jan. 27, 2004   (DE) .................. 10 2004 004 084

(51) Int. Cl.
*B29C 55/06* (2006.01)
(52) U.S. Cl. ................. 26/71; 26/99; 26/51; 264/288.4
(58) Field of Classification Search ............. 26/106, 26/71, 51, 99, 87, 72, 52, 89, 97, 98, 100, 26/DIG. 1; 28/245, 246, 165; 264/288.4, 264/291, 289.6; 425/66
See application file for complete search history.

(56) References Cited

U.S. PATENT DOCUMENTS

| 3,201,826 | A |   | 8/1965 | Brückner |
| 3,394,429 | A | * | 7/1968 | Nakagawa et al. ............. 26/106 |
| 3,724,243 | A | * | 4/1973 | Calamari et al. .............. 26/106 |
| 3,744,106 | A | * | 7/1973 | Mayr et al. .................... 26/106 |
| 3,807,004 | A | * | 4/1974 | Andersen ....................... 26/88 |
| 3,816,886 | A | * | 6/1974 | Van Cappellen ............. 26/106 |

(Continued)

FOREIGN PATENT DOCUMENTS

EP   0 529 460   3/1993

(Continued)

*Primary Examiner*—Amy B Vanatta
(74) *Attorney, Agent, or Firm*—Connolly Bove Lodge & Hutz LLP

(57) ABSTRACT

The invention relates to a device for drawing a film web, made from a thermoplastic plastic, comprising at least one driven roller (2), driven at a speed V1 and at least one second driven roller (3), driven at a speed V2, where V1<V2. The rollers (2, 3) are serially arranged such that a drawing gap (4) is embodied between the two rollers (2, 3). A width-maintaining device is arranged in the drawing gap (4), which mechanically grips both edges of the film web such that the width of the film web is essentially maintained during the longitudinal drawing in the drawing gap (4). The invention further relates to a method for the longitudinal drawing of films which are drawn by means of said device.

26 Claims, 12 Drawing Sheets

U.S. PATENT DOCUMENTS

Figure 1:
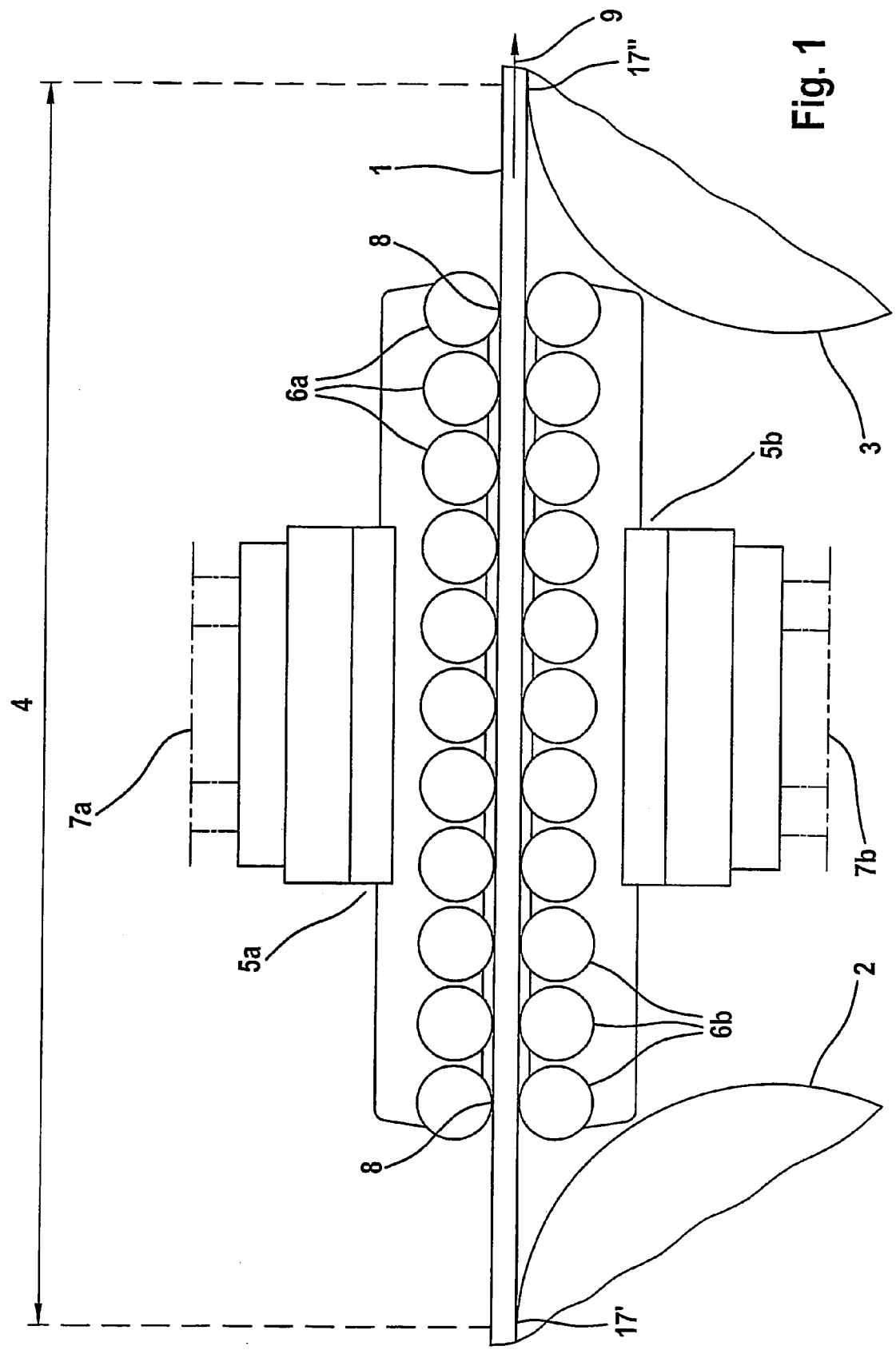

| | | | |
|---|---|---|---|
| 4,293,508 A | * 10/1981 | Heirbaut et al. | 264/481 |
| 4,676,943 A | * 6/1987 | Stockmeyer | 264/288.4 |
| 4,767,578 A | * 8/1988 | Thimon | 264/40.1 |
| 4,952,363 A | 8/1990 | Oshima et al. | |
| 5,017,323 A | * 5/1991 | Balk | 264/288.4 |
| 5,355,564 A | * 10/1994 | Gunter et al. | 26/94 |
| 5,537,726 A | * 7/1996 | Rutz et al. | 26/99 |
| 5,901,423 A | * 5/1999 | White et al. | 26/71 |
| 6,767,501 B1 | * 7/2004 | Kirjavainen | 264/572 |

FOREIGN PATENT DOCUMENTS

| | | |
|---|---|---|
| JP | 60-104313 | 6/1985 |

* cited by examiner

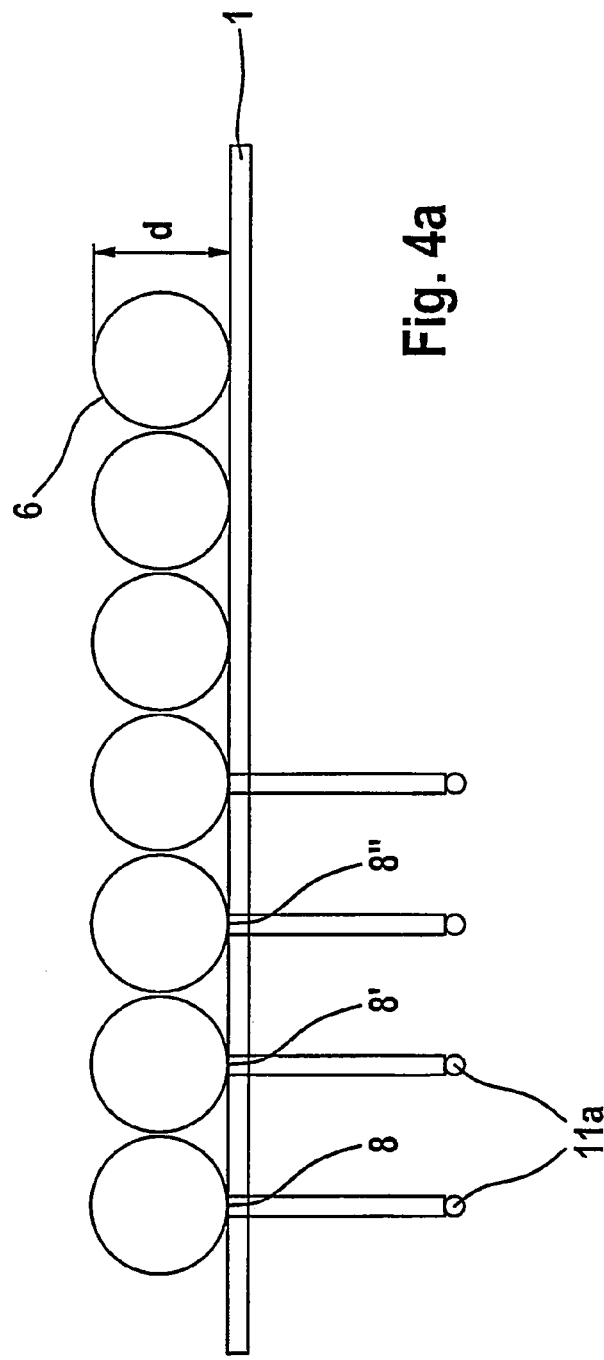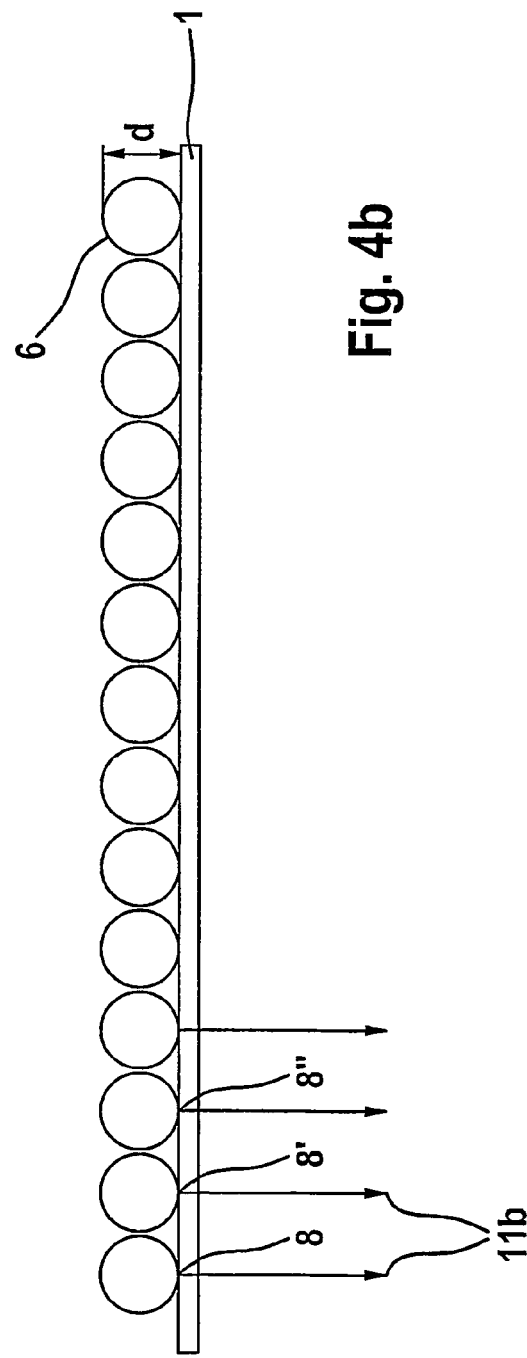

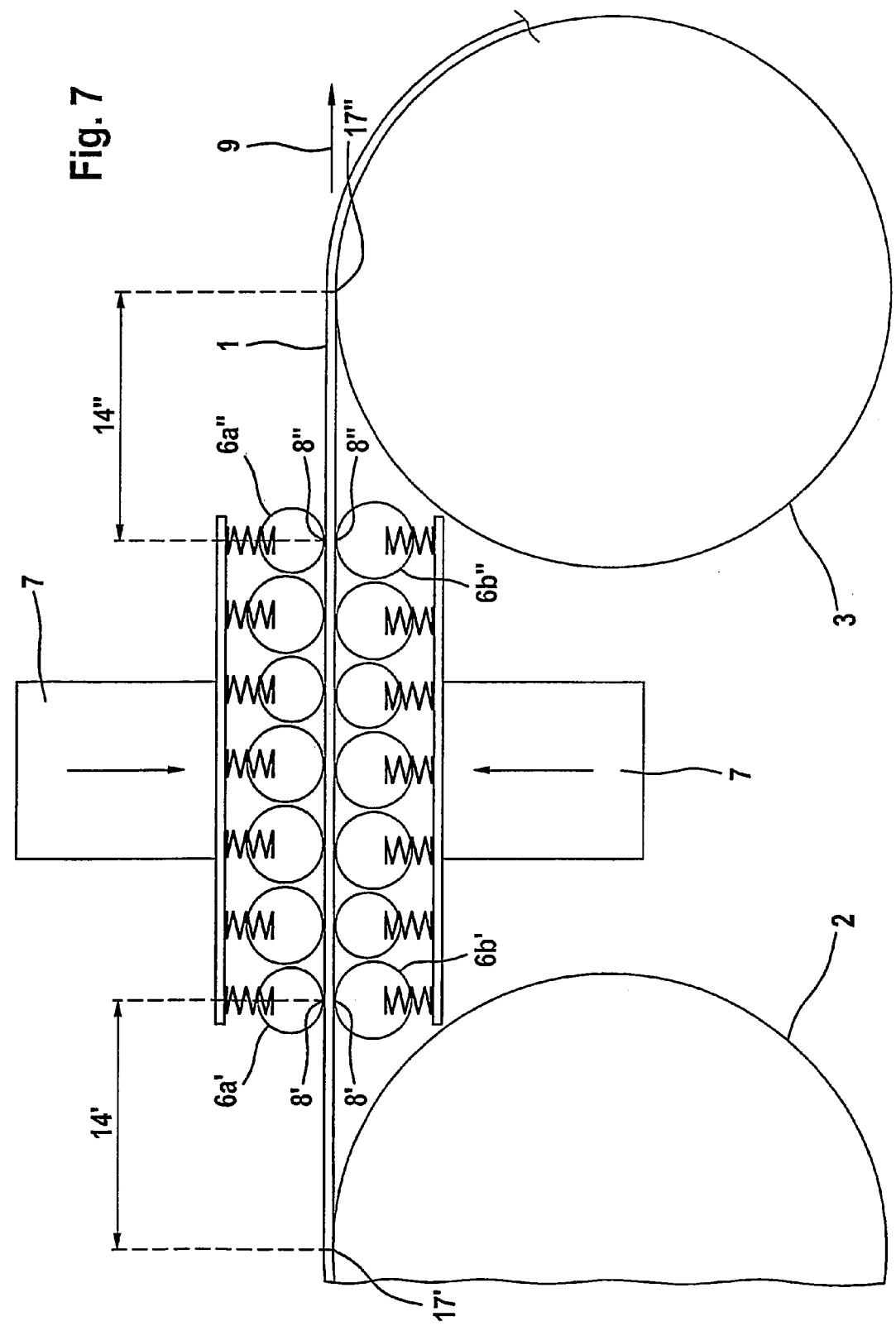

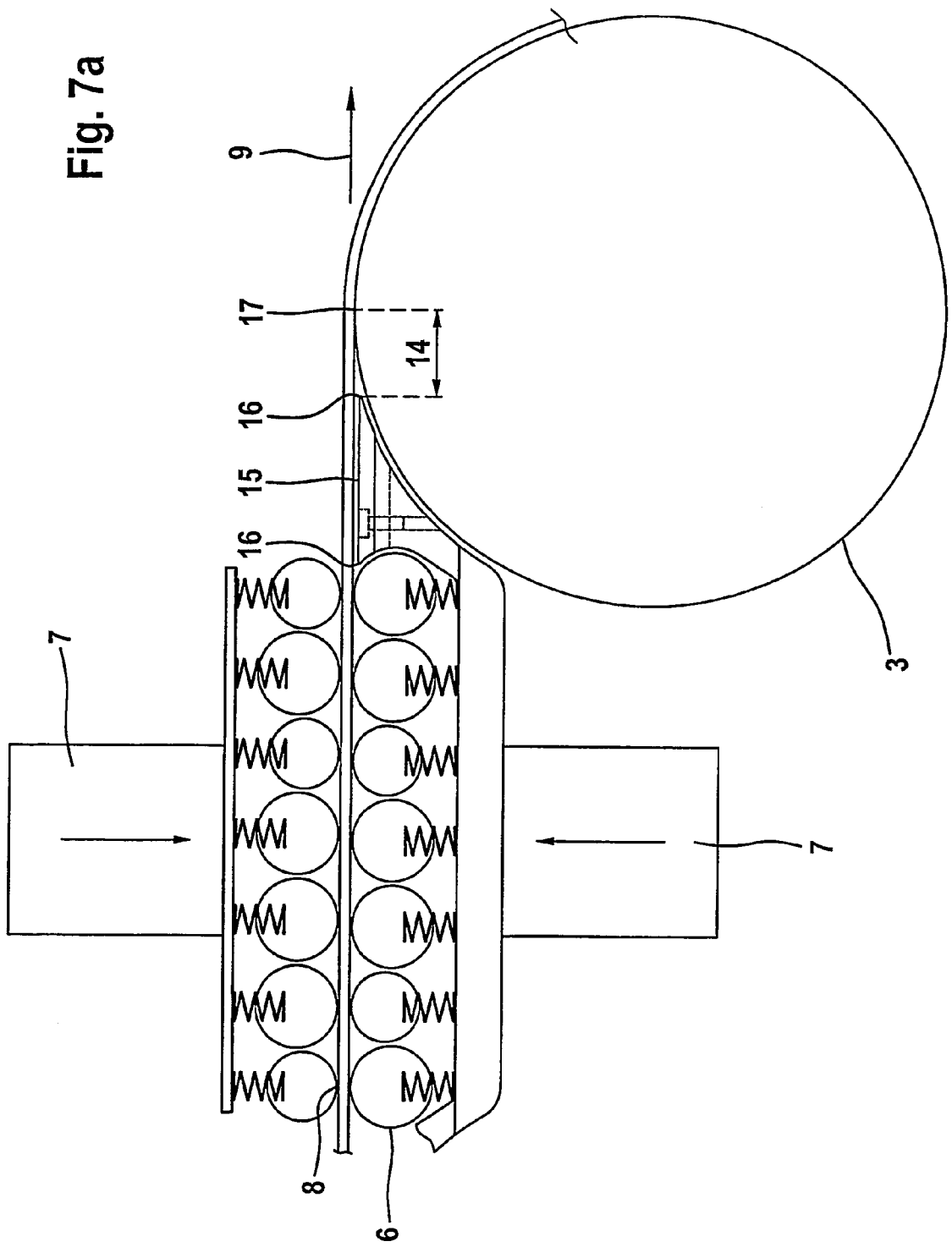

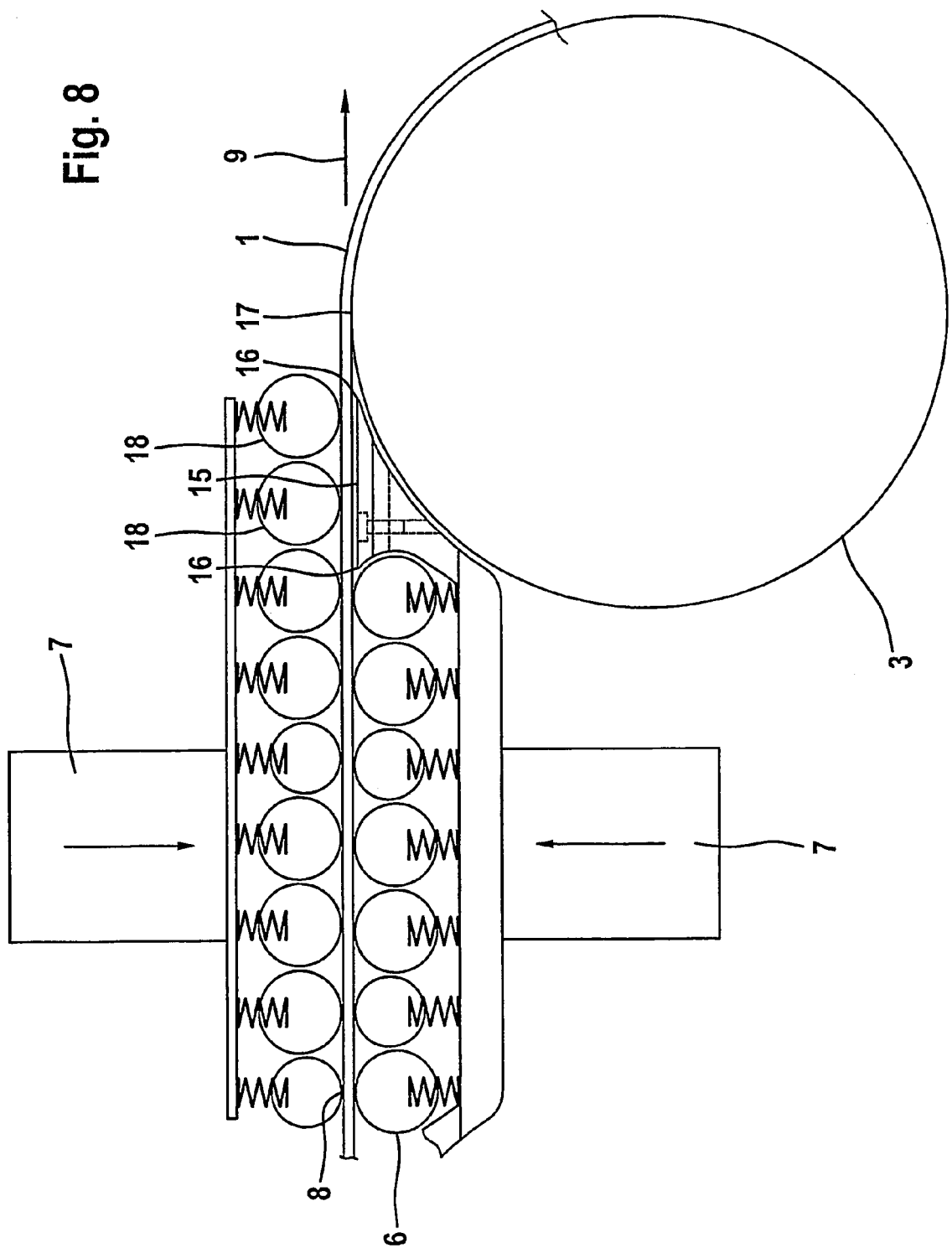

METHOD AND DEVICE FOR LONGITUDINAL DRAWING OF A FILM WEB

RELATED APPLICATIONS

This application is a national stage application (under 35 U.S.C. 371) of PCT/EP2005/000385 filed Jan. 17, 2005, which claims benefit of German application 10 2005 004 084.2 filed Jan. 27, 2004.

The present invention relates to a process and a device for drawing a film web in longitudinal direction. The process can be used for drawing biaxially oriented film and also for drawing cast film or prefilm.

Biaxially oriented films are known in the state of the art and used in many different fields of application. In particular, biaxially oriented polypropylene films have also been developed in the last few years which shrink more or less strongly in one or the other direction at elevated temperatures. The shrinkage properties depend on the composition of the individual layers and on the conditions during the manufacture of the film. The temperatures during drawing, the draw factors and subsequent fixing, in particular, are decisive. By varying these conditions, the shrinkage properties of a biaxially oriented film can be varied within a wide range.

For some applications, it is particularly desirable for the films to exhibit a high shrinkage in only one direction while the shrinkage in the other direction should simultaneous be as low as possible. Such applications are, for example, shrink wrapping films for all-round labels. For all-round labelling, for example, a flat film is first formed into a hose or a hose section which is pushed over the container to be labelled. Subsequently, this hose is shrunk at an elevated temperature. According to an alternative process, processing of the films takes place directly from the roll. The roll is first wound around the container or the moulded body and bonded together. During the subsequent shrinkage process, the film clings tightly in the so-called roll-on shrink-on process ("ROSO").

Obviously, a film with a high shrinkage in the transverse direction is required for the former process while the ROSO process requires a high longitudinal shrinkage. For the lettering and decoration of this all round label not to become distorted, the shrinkage in the respective opposite direction must be equal zero, as far as possible.

The manufacture of such a film from polypropylene causes considerable difficulties in practice. According to the usual manufacturing processes (flat film processes), the films are first extruded, cooled and subsequently biaxially drawn. Drawing in the longitudinal direction by rollers running at different speeds is generally carried out first. Subsequently, orientation in the transverse direction takes place within a frame. This biaxially drawing ensures important application characteristics such as mechanical strength, rigidity, transparency, a homogeneous thickness profile etc. It has been found that, in principle, it is possible to make a film with a high longitudinal shrinkage and a low transverse shrinkage by means of this process; however, extreme conditions need to be maintained during drawing and fixing which cannot be easily achieved with the usual structural facilities, in particular the frame geometries. As a rule, modifications to the plants are required. As a result, changeover in production is time-consuming and, in the end, makes the product uneconomical or the quality is unsatisfactory, the longitudinal shrinkage, in particular, being too low and the dimensional stability in the transverse direction unsatisfactory.

It is known in the state of the art that the longitudinal shrinkage of a biaxially oriented film can be increased by carrying out further drawing in the longitudinal direction (additional longitudinal drawing) following biaxial drawing. Within the framework of the investigations concerning the present invention, it has been found, however, that it is not possible be means of this measure to simultaneously ensure that the transverse shrinkage of the film remains equal nil. It has been found that, as a result of additional longitudinal drawing, the properties of the film in the transverse direction are also considerably influenced. Firstly, it was found that the width of the film is considerably reduced during the second drawing in the longitudinal direction and a negative transverse shrinkage is produced, i.e. the additionally longitudinally drawn film expands at an elevated temperature. The reduction of the width as a result of longitudinal drawing is well known and referred to in the field of film technology also as necking. However, as a result of the subsequent drawing in transverse direction, which normally follows, the negative effects of this necking are compensated for. The "negative" transverse shrinkage (transverse expansion) which arises as a result of additional longitudinal drawing is, however, just as unacceptable as an excessive transverse shrinkage since, in the end, similar distortions of the printed image arise, as a result, during the shrinkage application of the all-round label.

The object of the present invention consequently consisted of providing a process according to which an oriented polypropylene film can be manufactured which exhibits a high longitudinal shrinkage at an elevated temperature and, simultaneously, does not modify its dimensions in the transverse direction under the effect of this temperature. The process is required to be simple, economically efficient and suitable for use for various film materials, in particular for biaxially drawn polypropylene films. Moreover, the process should be suitable also for other starting materials in a highly flexible manner. It was consequently, moreover, an object to indicate a process for longitudinally drawing a cast film or prefilm.

This object is achieved by a process for longitudinally drawing an at least single-ply film (1) of thermoplastic polymer which film is heated, before drawing in the slowly operating part of the drawing unit, to a temperature suitable for drawing and passed to a drawing zone, the slowly operating part of the drawing unit containing the driven roller (2) and the rapidly operating part of the drawing unit containing the driven roller (3) and the pair of rollers (2)/(3) being arranged in such a way that a drawing gap (4) is formed between these two rollers (2)/(3) and the film (1) is passed into the drawing gap (4) characterised in that the film (1) is mechanically gripped by a fixing device, during drawing in the area of the drawing gap (4) between the rollers (2)/(3) in the peripheral areas (10), and fixed in such way that the width of the film, which it exhibits on entering the drawing gap (4) is not significantly changed during drawing.

FIG. 1 shows the device for width-maintaining in a diagrammatic cross-section representation. The film (1) is drawn between a slowly operating roller (2) and a rapidly operating roller (3) (drawing rollers). The area between the access point (17') of the film onto the roller (2) and the exit point (17") from the roller (3) forms the drawing gap (4). In the drawing gap (4), the two carriages (5a) and (5b) are arranged above and below the film (1). The carriages (5) comprise a punch or pressure cylinder (7a) and (7b) and the fixing rolls (6a) and (6b). By means of the pressure cylinders (7), the carriages (5) are pressed in the direction of the film surface. In this way, the film (1) is clamped between the fixing rolls (6a) and (6b) and fixed. Depending on the construction, the rolls (6) touch the film surface at one or several contact points (8).

Figure 2:
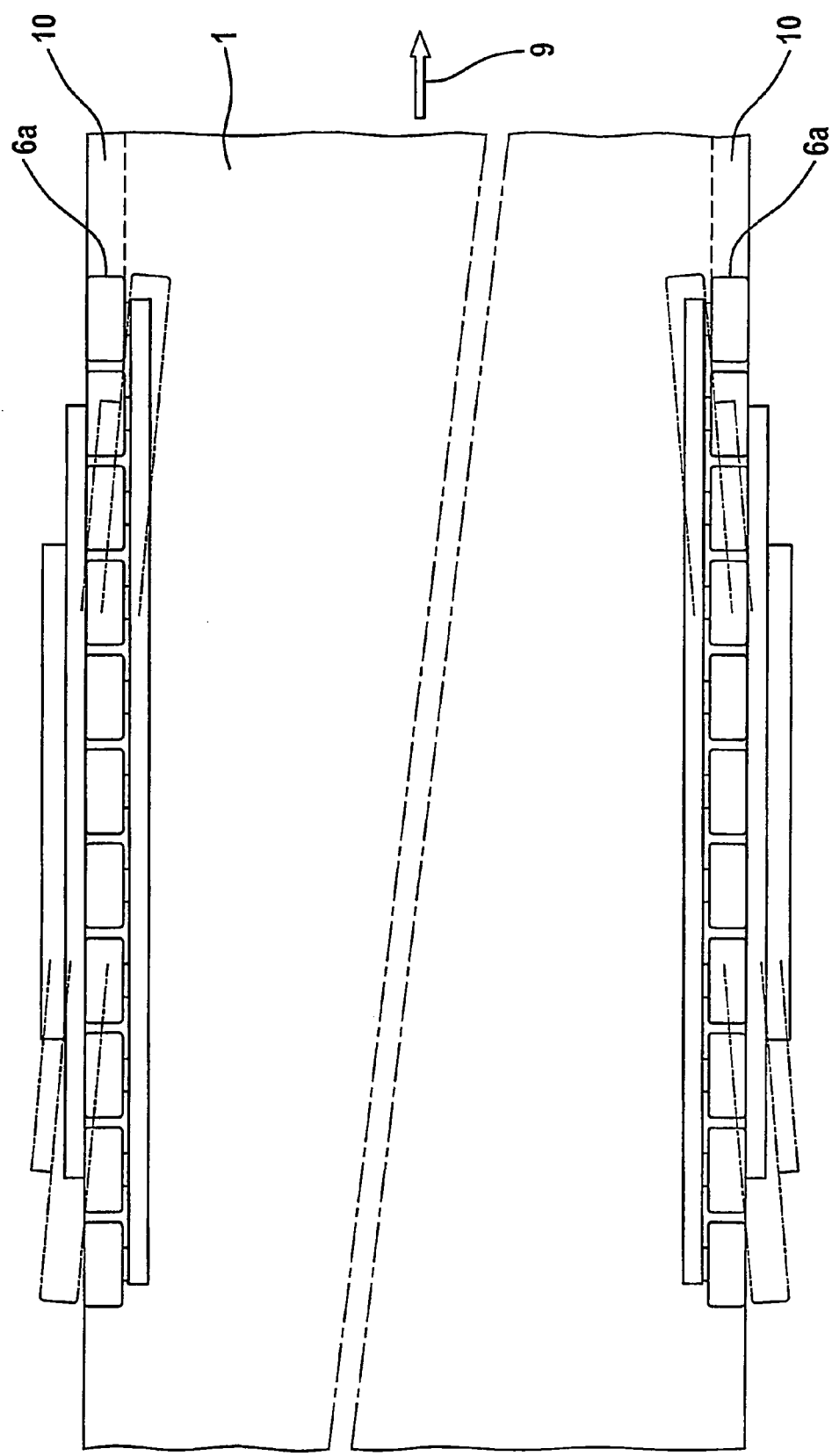

FIG. 2 shows a diagrammatic top view onto the film web (1) with the fixing device in the two peripheral areas (10) of the film (1). (9) is the direction of advance of the film web (1). The rolls (6a) of the carriages (5a) situated above the film (1) respectively are illustrated. It is shown that the rolls (6a) are arranged in the peripheral area (10) of the film (1). Obviously, this applies also to rolls not illustrated (6b) because they are underneath.

Figure 3:
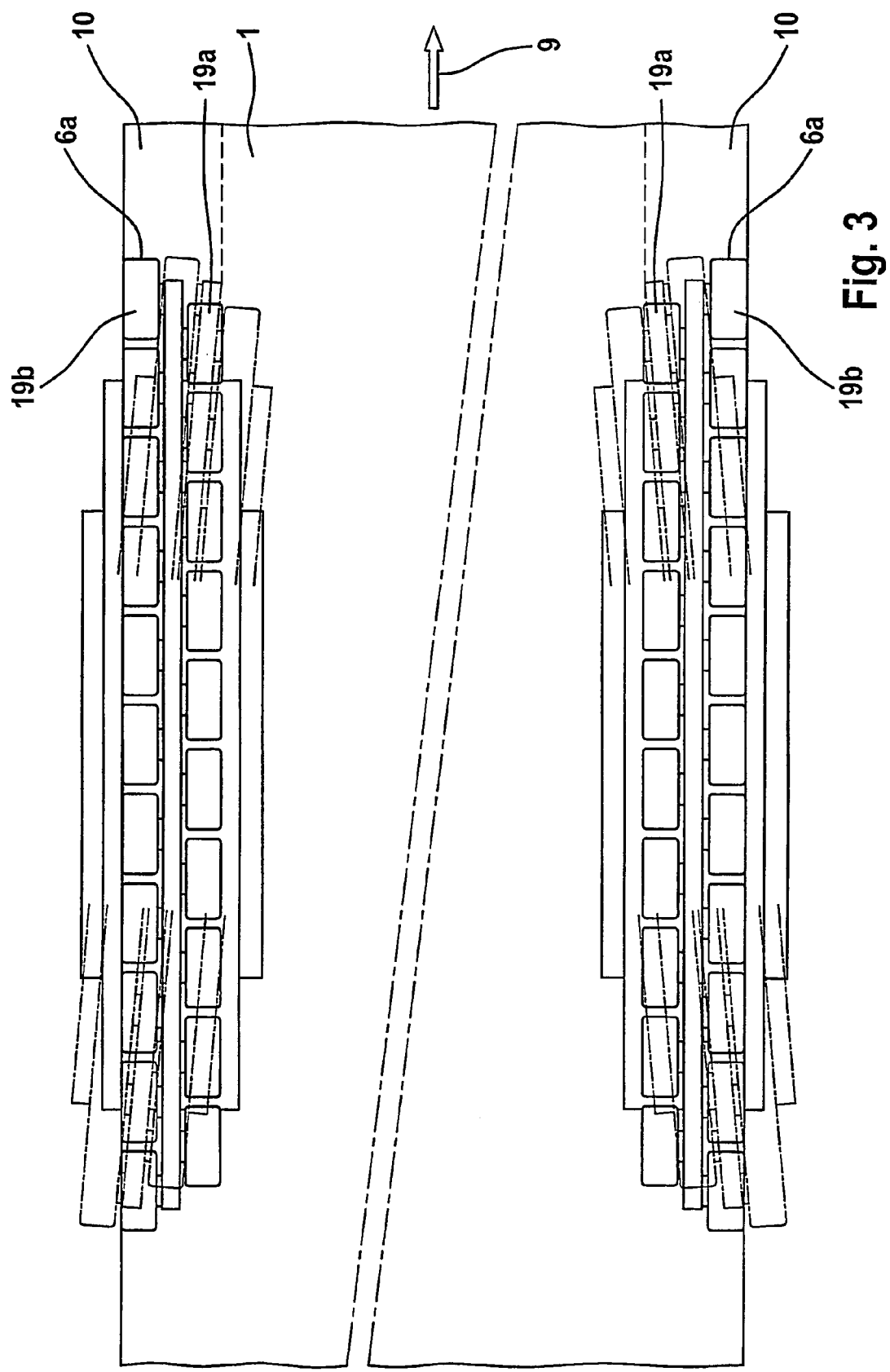

FIG. 3 is a diagrammatic top view of a film web (1) with a double row arrangement of the fixing rolls. As can be seen, the rolls are arranged in two rows situated side by side (19a) and (19b), the positions of the fixing rolls (9) of each row being displaced vis-à-vis each other.

FIG. 4 shows diagrammatically how the distance (11) between the contact points (8) is shortened if the diameter of the fixing rolls is reduced. The fixing rolls (6) are in contact with the film (1) at the contact points (8); (8'); (8"). As a result of the diameter of the rolls (6), a spatial distance (11) arises between the contact point (8). Starting out from a given diameter d of the rolls (6) (compare FIG. 4a), this distance decreases from (11a) to (11b) (compare FIG. 4b) if the diameter d of the rolls (6) is reduced.

Figure 5:
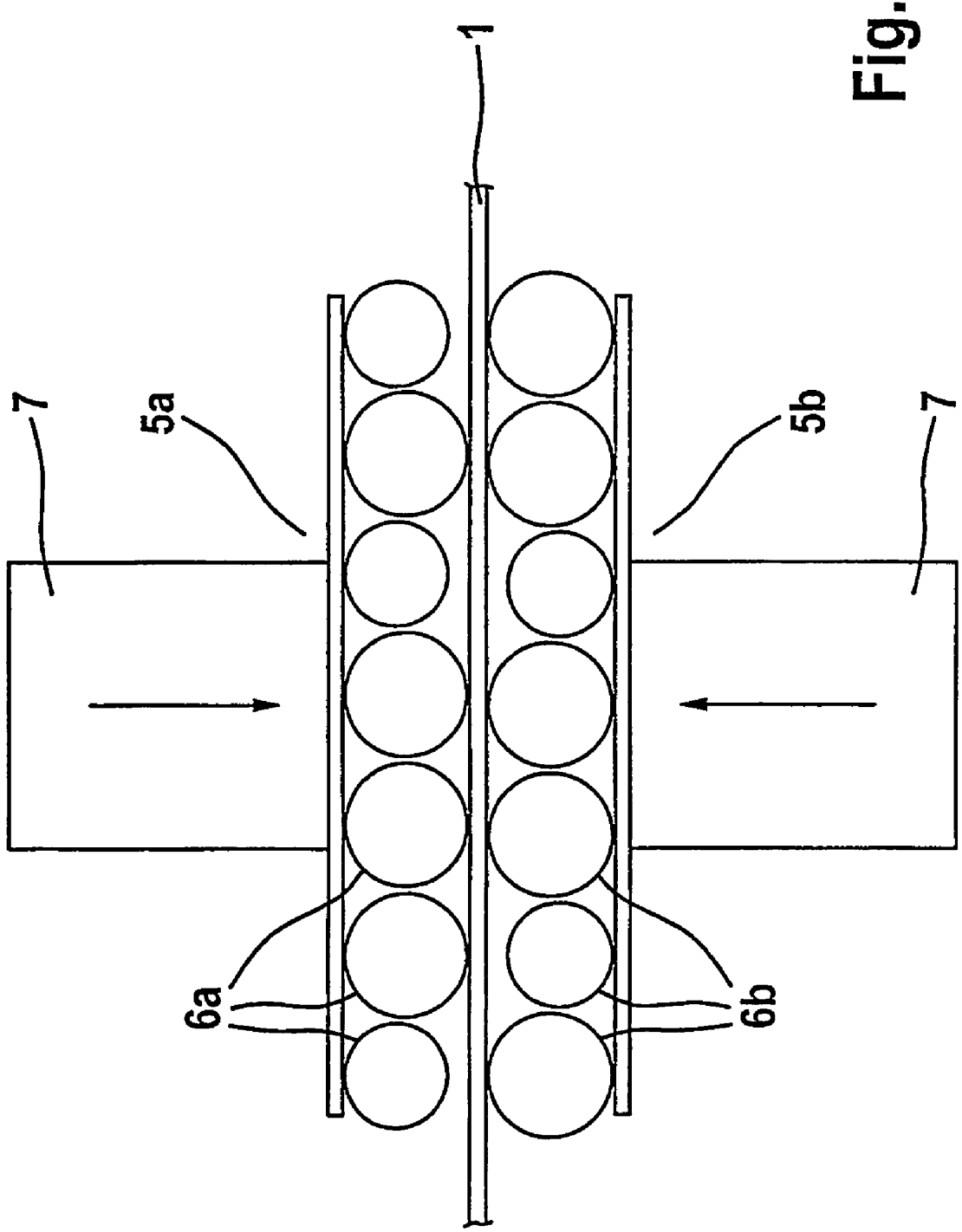

FIG. 5 shows the consequences in the case of tolerances in the diameter of the fixing rolls (6). In a diagrammatic representation it is shown how not all the rolls (6) are in contact with the film (1) in the case of a rigid method of fixing of the rolls (6) to the carriage (5) if the rolls (6) do not all have exactly the same diameter.

Figure 6:
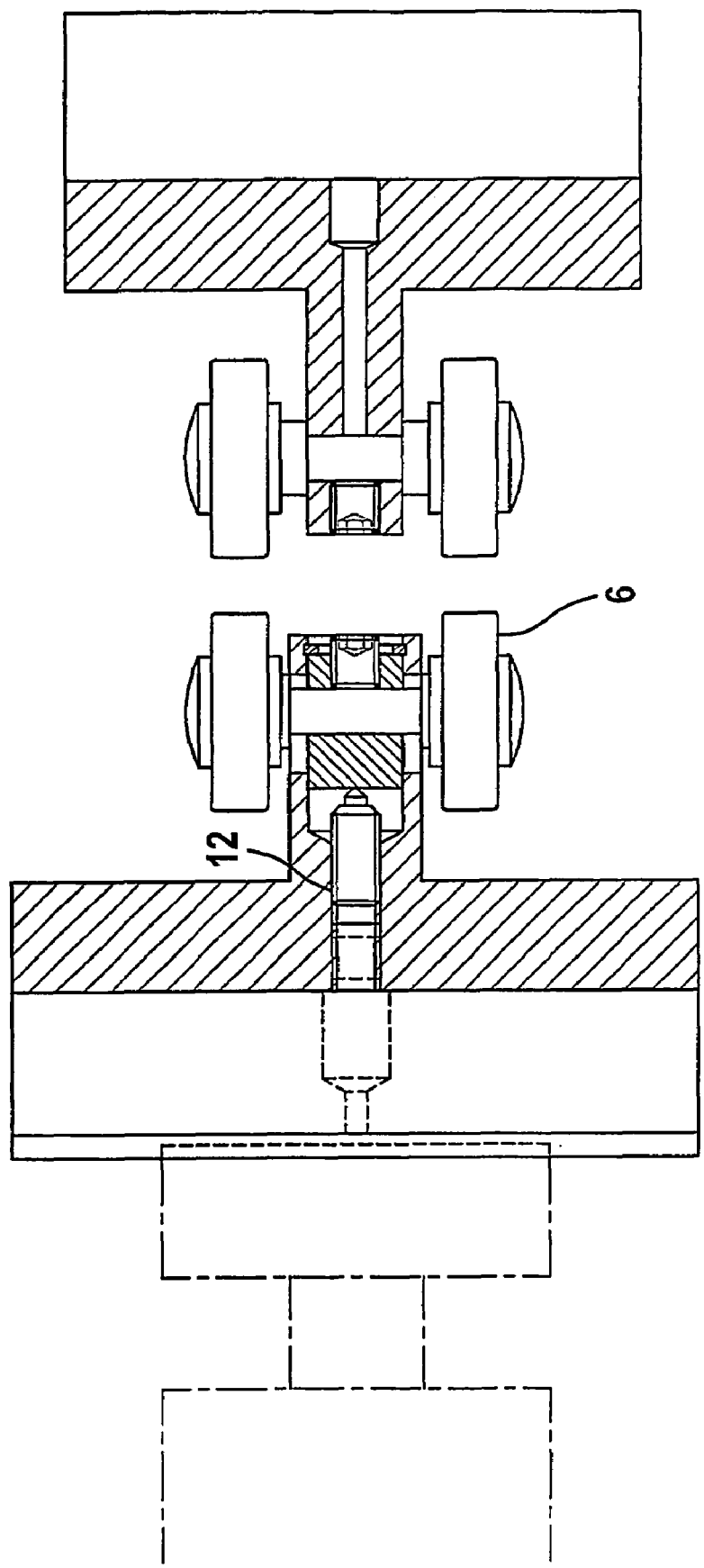

FIG. 6/6a shows a preferred embodiment with non-rigid, i.e. flexibly supported rolls (6), as a result of which the problem according to FIG. 5 is solved. It is shown how rolls (6) with a non homogeneous diameter are fitted to the carriage (5) in a springy or sliding manner. Rolls having a larger diameter compress the spring (13). In this embodiment, all rolls (6) are in contact with the film (1) such that there is one or several contact points (8), attributable to the design, for every fixing roll (6).

FIG. 7 shows an arrangement with a carriage (5) and flexibly supported rolls (6) and drawing rollers (2) and (3). It is shown that an area remaining free (14') is formed between the contact points (8') of the first fixing rolls (6'a) and (6'b) and the access points 17', in which area the film (1) is not fixed. The same applies to the area between the last fixing roll (6"a) and (6"b) and the exit point (17").

FIG. 7a shows an arrangement similar to FIG. 7, an additional slide bar (15) being arranged in the area remaining free (14') or (14") according to FIG. 7. This slide bar (15) is formed in such a way that the film (1) passes over this slide bar (15) in the area (14). For this purpose, the slide bar (15) has ends which taper towards the drawing roller (2)/(3) and towards the first or last fixing roll. The areas remaining free (14) are considerably shorter in comparison with FIG. (7).

FIG. 8 shows an arrangement similar to FIG. 7a. In this case, additionally fixing rolls (18) are arranged on the carriage (5a) above the slide bar (15) above the film web (1), which rolls press the film (1) against the slide bar (15) and thus fix it additionally directly after leaving the access or exit point (17). The slide bars are an optional feature and can be omitted, depending on the properties of the film web.

Figure 9A:
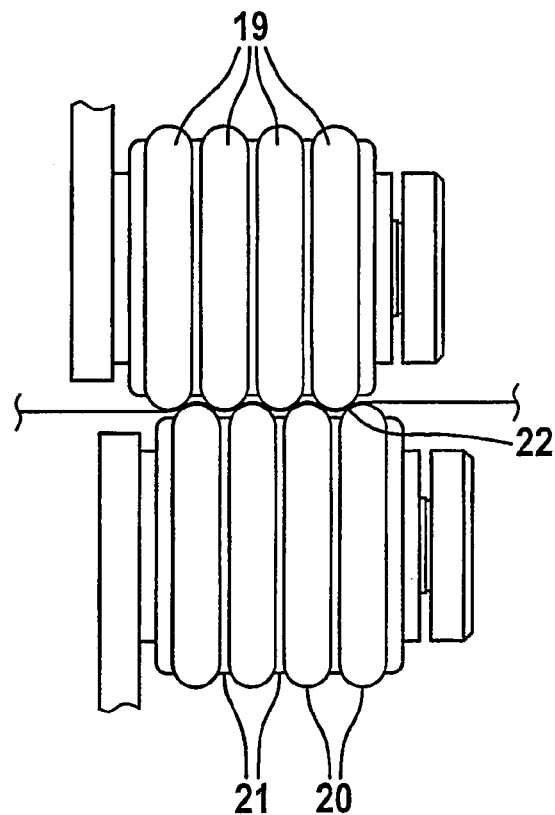
Figure 9B:
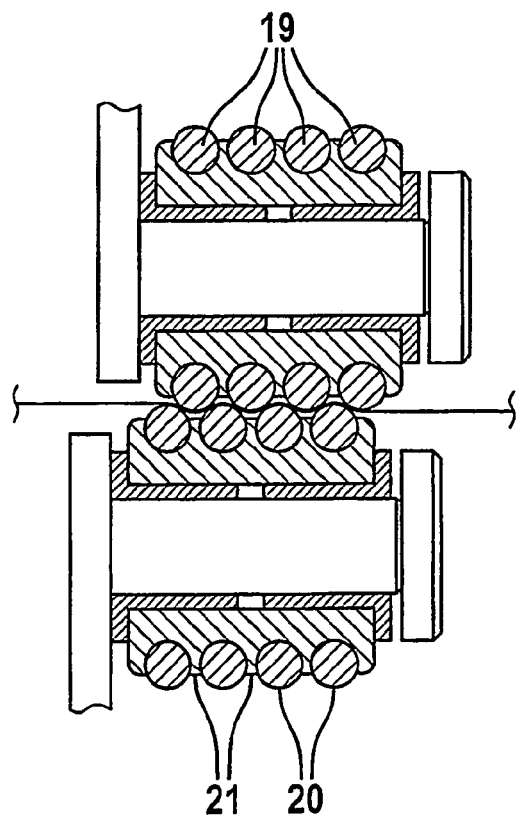
Figure 10:
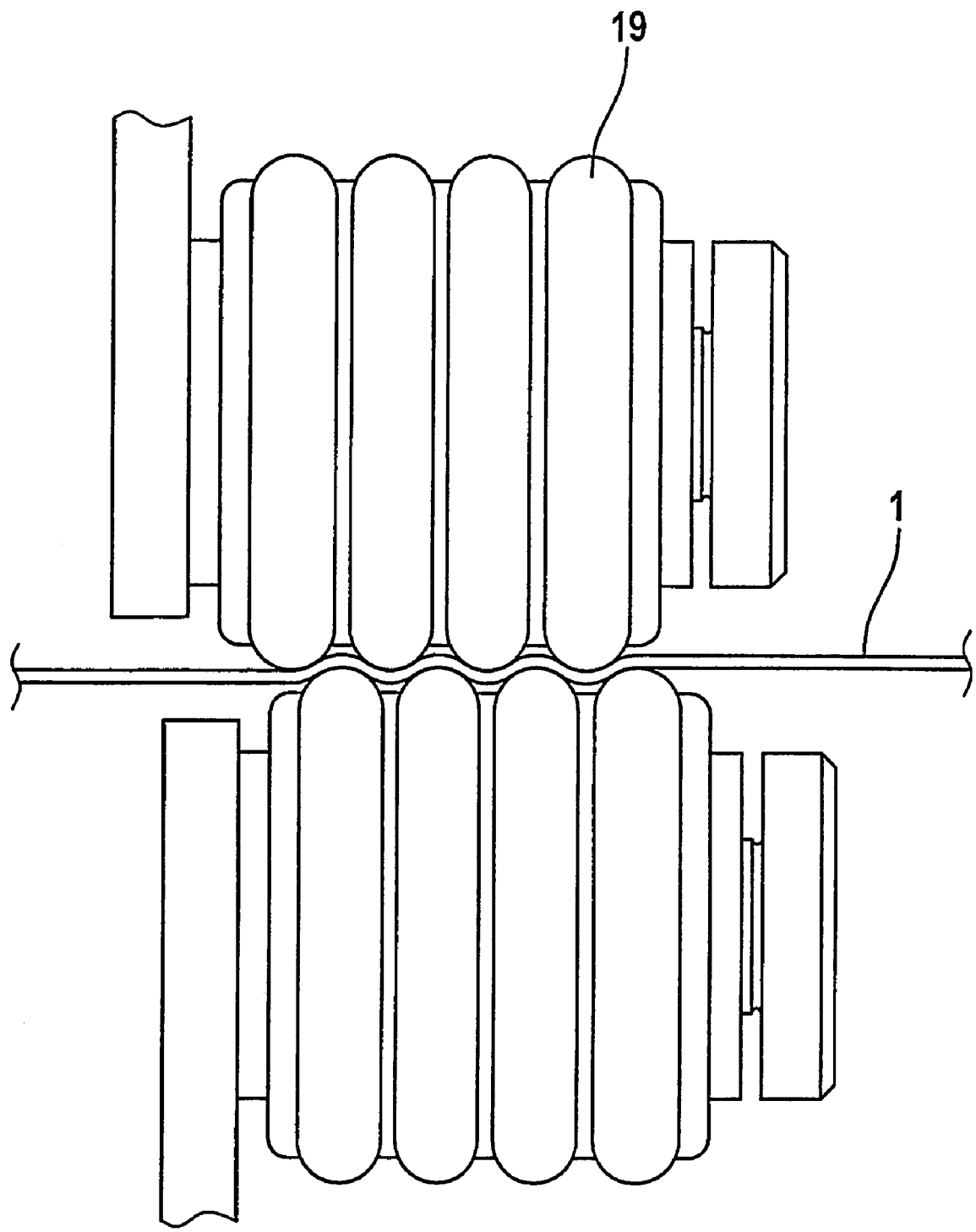

FIG. 9a and FIG. 9b show fixing rolls with a profiled surface as a top view and as a cross-section. In the embodiments illustrated, the fixing rolls are covered with 4 O rings (19) respectively as a result of which a profile is formed with even raised areas (20) and indentations (21). The figures show how the profiled rolls are positioned above and below the film web in such a way that the raised areas and indentations engage each other (22). FIG. 10 shows how, as a result of the profiling in association with the displaced positioning of the rolls, the film web surrounds the profiling in an undulating form.

The device according to the invention consists basically of two parts which are arranged, in the two peripheral areas (10) opposite the film (1), i.e. above and below the film (1), in the following also referred to as carriage (5). Each carriage (5a) and (5b) exhibits numerous rolls (6a) and (6b) which are arranged in a row (FIG. 1) or a double row (FIG. 3) in sequence. The length of the row corresponds approximately to the length of the drawing gap (4). The distance between the rolls (6) within the row or within the double row should be as small as possible. The diameter of the rolls (6) is selected in a ratio to the length of the drawing gap (4) in such a way that several rolls (6) can be arranged in the drawing gap (4), for example, at least 3, preferably 5 to 20 rolls (6) are arranged per side and carriage, the number of rolls being correspondingly doubled in the case of a double row design. The rolls (6) are arranged evenly distributed over the entire length of the drawing gap (4). The embodiment with a double row arrangement of the rolls (6) (FIG. 3) is preferred. As a result of this arrangement, the distances between the contact points (8) vis-à-vis a single row arrangement are halved and the contact surface, i.e. the number of contact points (8) is increased overall or almost doubled. The two rows should be positioned as closely to each other as possible for the width of the periphery (10) to remain as small as possible.

The two carriages (5a) and (5b) are positioned in the drawing gap (4) above and below the film (1) in such a way that the rolls arranged in rows (6) are aligned parallel to the direction of advance (9) of the film and are in contact with the peripheral area (10) of the film such that the rolls (6) rotate in the direction of advance (9) of the film when the film (1) passes through. Deviations of up to ±10° are possible from the parallel alignment of the rolls without the effect of fixing being negatively influenced, i.e. the rolls can also be positioned somewhat at an angle to the film web. By means of corresponding devices such as e.g. a pressure punch (7) on the two carriages (5a) and (5b), the contact pressure of the two carriages (5a) and (5b) can be controlled in such a way that the roll pairs consisting of the rolls arranged above and below (6a) and (6b) quasi clamp the film (1), i.e. fix it, in such a way that no or only little widthwise necking is possible in the longitudinal direction. In general, the film width is reduced during longitudinal drawing according to the invention by a maximum of 20% compared with the original width before longitudinal drawing, preferably by 0-15%, in particular by 2-12%. As a result of the numerous pairs of rolls (6a) and (6b), particularly in the case of double rows, a corresponding number of contact points (8) or fixing points is guaranteed in which the film (1) is held between the upper and the lower rolls (6a) and (6b). The smaller the rolls (6), the more contact points (8) guarantee fixing, which is as uniform as possible, over the length of the drawing gap (4) during drawing. It goes without saying that for structural design reasons, there are limits to the size reduction of the rolls (6).

The film web (1) is fixed over the length of the drawing gap (4) in its peripheral area (10) by the pairs of rolls (6a) and (6b) of the upper and lower carriages (5a) and (5b). The rolls (6) of the pairs of rolls (6a) and (6b) are dimensioned in such a way that their diameter is generally smaller than their width $b_g$ such that the term "roll" characterises this element more appropriately than the term "roller". However, it is also possible for appropriately dimensioned rollers to satisfy an equivalent purpose. Such "rollers" are used above all for drawing wider film webs in order to achieve better lateral fixing. Depending on the design and the width of the fixing rolls, a contact area results from the contact between the roll and the film periphery which extends over the width of the film roll. According to the meaning of the invention, the "contact points" which are mentioned repeatedly in this description should consequently also comprise approximately line-type contact areas which are formed over the width of the roll etc.

The expert will select the size of the elements, i.e. the roll diameter and the roll width, as a function of the thickness and width of the film web, the drawing speed and the drawing factors as well as the width of the peripheral area. The diameter of the rolls (6) depends in particular on the dimensions of the drawing unit, in particular the size of the drawing gap (4). In comparison with the length of the drawing gap (4), the expert will select the diameter as small as possible in order to maximise the number of contact points (8). The width of the roll depends on the thickness and the width of the film web (1) and the drawing force to be applied for longitudinal drawing. The greater the drawing force, the larger should the contact surface be in order to guarantee good fixing. Naturally, the roll width will also depend on whether a single row or double row design is implemented. Double row embodiments naturally have smaller rolls. The film web width itself depends on the type of material and the predetermined machine dimensions and can consequently vary within a wide range. As an example, the film web (1) will not be wider than 5*m*, preferably 0.2 to 3 m. The drawing gap (4) should be as short as possible.

To guarantee an even determination of the film periphery (10) over the entire length of the drawing gap (4) it is necessary for the rolls (6) to be arranged from the beginning to the end of the drawing gap (4) and for all rolls (6) to have the same diameter. Obviously, limits are set in this case by the usual manufacturing tolerances. In general, the diameter of the rolls within a carriage (5*a*) and (5*b*) should not deviate from each other by more than 10%. This applies both to the roll itself and to the overall roll diameter including coatings which maybe applied.

Basically, the rolls (6) can be made of any desired material or material composite which satisfies the requirements. The surface should be designed in such a way that a non-slip connection is promoted between the film web (1) and the roll surfaces. A relative movement (slipping) between the material web and the roll surfaces should be avoided. Preferably, the surface of the rolls (6) should be provided with a rubber cover (e.g. rubber rings, compare FIGS. 9 and 10) which ensures the necessary adhesive friction to avoid slippage. As an example, the surface can also be covered with a special metal, e.g. copper. The combination of a wide variety of roll types (metal on rubber) is conceivable, depending on the film web.

According to a further embodiment, the surface and/or the roll form is designed in such a way that a non-slip connection between roll-film-roll is further improved. For this purpose, rolls with a profiled surface have proved advantageous, i.e. each roll surface exhibits indentations and raised areas which are evenly distributed over the width of the roll. At the same time, these profiled rolls are positioned above and below the film web in such a way that the raised area of the roll underneath is opposite the indentations of the roll situated on top (or vice versa) and these engage with each other on applying contact pressure on the rolls. As a result, the film periphery surrounds this profiling in an undulating manner and a larger contact surface is produced with an increased contact pressure. As a result, a groove-type pattern is formed in the peripheral area of the film. Since this peripheral area is later seamed, this "deformation" is not a disadvantage.

Such embodiments consist, for example, of fixing rolls which are covered with a number of O rings. A similar effect can also be achieved by engraving thick roll coatings of metal or rubber. As an alternative, nub-type coatings can be applied onto the roll surface. For such profiled roll surfaces, rubber or synthetic resin surfaces are also preferred.

In general, the rolls (6) do not have an independent drive. They are driven via the advancing film web (1) and have a peripheral speed $V_R$ which is adjusted by the web speed of the film web (1) in conjunction with drawing.

Figure 6A:
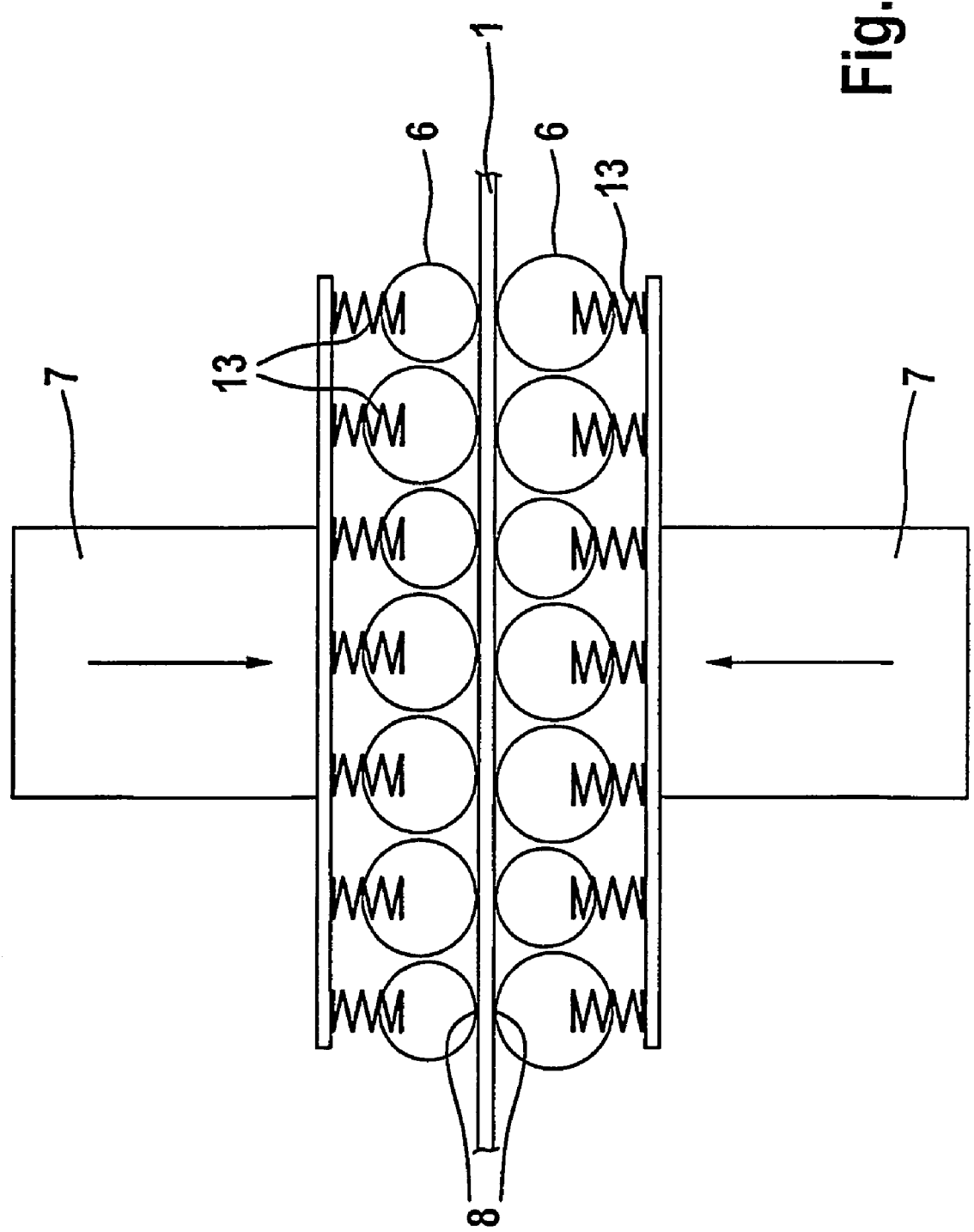

Within the framework of the investigations regarding the present invention, it was found that an even determination of the film peripheries (10) by the roll pairs (6*a*) and (6*b*) which are optionally profiled and arranged in a displaced manner over the entire length of the drawing gap (4) is particularly advantageous. In the ideal case, both film peripheries would have to be held continually over the length of the drawing gap (4) with a constant force in order to prevent undesirable necking and its negative effects. Allowance is made for the determination, as continuously as possible, by a large number of rolls (6) of very small dimension as a result of which many closely situated contact points (8) are produced (FIG. 3). The smaller the roll (6) the shorter are the areas "remaining free" (11) between the individual contact points (8) (FIG. 4). However, it is found that as a result of many very small rolls (6) another problem arises. The film (1) may not be fixed at all the contact points or the contact areas (8) with the same force, i.e. a uniform contact pressure of all the rolls (6) is not always obtained. Although, in principle, the entire carriage (5*a*)/(5*b*) with all the rolls (6*a*) and (6*b*) is pressed downwards or upwards towards the film (1) via a pressure cylinder (7) such that, in principle, all rolls (6) are pressed with the same force onto the film and/or against each other, it is found that, as a result of manufacturing tolerances of the roll diameters and variations in the thickness of the roll coatings applied, e.g. the rubber coating, not all contact pressure rolls are pressed onto each other with the same force. The consequence of this is that the film (1) is not gripped in a non-slip manner in all areas or the contact pressure at the individual contact points (8) is not the same for every roll pair (6*a*) and (6*b*) (FIG. 5). In the case of a preferred embodiment according to FIG. 6, this disadvantage could be eliminated. In this embodiment (FIG. 6), the rolls are fixed on the carriage (5) not rigidly but flexibly, for example via a cylindrical slight bolt (12) and preferably rested simultaneously against a springy pressure element. This springy pressure element can be achieved in the simplest case by a headless screw with a spring placed underneath. The flexible or springy support (13) of the rolls (6) allows the entire carriage (5) to press onto the film periphery to such an extent that all the rolls (6) are in non-slip contact with the film periphery (10). The excessive diameter of individual rolls (6) can now be compensated for by a springy compression of the rolls in the direction of the carriage (5) such that, as a result, all rolls (6) are pressed onto the film periphery (10) with the same force (FIG. 6*a*).

In a further particularly advantageous embodiment according to FIGS. 7*a* and 8, the design of the carriages (5) is modified in such a way that the uniform continuous determination of the film (1) is guaranteed even better over the entire length of the drawing gap (4). As explained above, many small rolls (6) arranged over the length of the drawing gap (4) ensure that the areas (11) between the contact points (8) remain as small as possible. It has been found that, in spite of this measure, relatively large areas "remaining free" (14) cannot be avoided on entry and on discharge of the film (1) into and/or from the drawing gap (4). This problem is caused by the different diameters of the fixing roll pairs (6*a*) and (6*b*)

and the drawing rollers (2)/(3). On entry into the drawing gap (4), the film (1) is guided over a slowly running roller (2) and meets the first fixing roll pair (6'a) and (6'b) of the two carriage (5a) and (5b) only after a distance (14'). This distance cannot be avoided from the structural design point of view since, even with a maximum approach of the first roll pair 6'a) and (6'b) to the drawing roller (2), a gap (14') remains as a result of the different diameters of the fixing rolls (6'a) and (6'b) and the drawing roller (FIG. 7). This applies in an analogous manner on discharge from the drawing gap (4). The film (1) leaves the last fixed roll pair (62a) and (6"b) and remains free until it meets (17") the rapidly rotating drawing roller (3). These gaps (14) lead to a width reduction being preventable only unsatisfactorily in the entry and the discharge area. This disadvantage can be eliminated only by a further preferred embodiment of the carriages (5a) and (5b).

In the case of this preferred design of the carriages (5) according to FIG. 7a, the first and last roll pairs (6'a/6"a) and (6'b/6"b) in the entry and the discharge area are supplemented by a slide bar (15) over which the film (1) is guided. This slide bar (15) is adjusted on at least one, preferably on both sides or ends (16) of the relevant form of the fixing rolls and/or the drawing rollers such that the slide bar (15) tapers towards the relevant contact point (8) and/or the access point (17) towards one or both sides. The film (1) consequently leaves the roller (2) at point (17) and meets the surface of the slide bar (15) directly after it is no longer in contact with the slow drawing roller (2). The film (1) passes over this slide bar (15) until it is gripped by the first fixing roll pair (6'a) and (6'b). In this way, the area originally remaining free (14') is shortened to a few millimeters (14''') according to FIG. 7a. The area (14''') is obtained from the distance between the one tapering end (16) of the slide bar (15) and the discharge point (17) of the drawing roller (2). The same applies in an analogous manner to the end of the drawing zone. In this case, the slide bar bridges the distance between the contact point (8) of the last fixing roll pair (6"a/6"b) and the access point (17") of the rapid drawing roller (3).

The surface of the slide bar (15) is coated with a suitable coating which, on the one hand, exhibits a sufficient adhesive force vis-à-vis the film material but simultaneously still allows sliding of the film (1) over this surface. Polished stainless steel or synthetic resin coatings, for example, are used. For the fixing of the film width in the area of the slide bar (15) to be particularly effective, the carriage opposite can exhibit additional fixing rolls (18) in this area such that the film (1) is fixed between the slide bar (15) and the additional rolls (18), as a result of which a width reduction is largely prevented also in this are (FIG. 8). In the same way as described above, these rolls (18) are also pressed against the slide bar (15) preferably in a spring-like supported manner, in order to build up a controlled and even contact pressure.

The film web (1) is fixed by means of the device described above during lengthwise drawing, in its peripheral area (10) by the roll pairs (6a) and (6b), which are optionally profiled and arranged in a displaced manner, of the upper and lower carriages (5a) and (5b), if necessary in association with the slide bar (15) and the additional rolls (18) in such a way that the width of the film (1) is not essentially altered during drawing. For this purpose, the two carriages (5a) and (5b) are pressed from above and from below against the film surface, it being possible to control the contact pressure via the corresponding cylinder (7). For this purpose, the film periphery (10) is clamped between the roll pairs (6a) and (6b) and/or between the slide bar (15) and rolls (18) in such a way that the usual width necking is effectively prevented. At the same time, the freely rotating rolls (6) of the two carriage pairs (5b) ensure an unhindered transportation of the film web (1) in the direction of advance (9). The fixed peripheral area (10) is usually small in comparison with the overall width of the web. The exact width of such a peripheral area (10) depends on the type of material and the total width of the web. In general, a peripheral area (10) should be understood to be the outer areas of the web which, together, may provide 20% of the total width, i.e. each peripheral area (10) provides 1 to 10% of the total width of the film web (1). It goes without saying that each film web (1) has two peripheries (10) which run parallel to the direction of advance (9). All data regarding "the peripheral area (10)" in this description apply obviously in the same way also to the opposite periphery.

The longitudinal direction according to the meaning of the present invention is the direction in which the film web (1) advances; this direction is also referred to as direction of machine advance. The transverse direction according to the meaning of the present invention is the direction which is at an angle of 90°, i.e. transverse to the direction of machine advance.

The process according to the invention is, surprisingly, excellently suited for additional longitudinal drawing of biaxially oriented films, in particular polypropylene films which had previously been manufactured in a separate production process, i.e. the process according to the invention for additional longitudinal drawing is preferably operated offline. In a similar manner, the device for drawing a cast film is used subsequent to its manufacture.

Cast films are essentially undrawn, i.e. after extrusion they are taken from a roller without additional measures for drawing of the film having been taken. In another possible variant, the use of the width-maintaining device is also possible "in line" during longitudinal drawing. In this case, the longitudinal drawing process according to the invention is combined with the manufacturing process of the films in such a way that the manufacture and drawing according to the invention are combined without necking in a single continuous process in the course of which the process according to the invention forms one process step. Below, the execution of the process according to the invention is explained in further detail.

For longitudinal drawing, the film web (1) is unwound, if necessary, and passed to the longitudinal drawing unit according to the invention by means of at least two driven drawing rollers (2)/(3) and the fixing device. Between the rotating rollers (2)/(3), the film (1) is drawn by the longitudinal drawing ratio f and, during this process, simultaneously fixed widthwise by the device described above. The speeds of the drawing rollers (2)/(3) are v1 and v2. The speeds determine, on the one hand, the speed with which the film (1) passes through the process and, on the other hand, the drawing tension which is applied in the longitudinal direction of the film web (1). Via this introduced drawing tension, the orientation of the cast film or the prefilm or the additional orientation of the already biaxially oriented film (1) takes place in the longitudinal direction (additional longitudinal drawing).

The longitudinal drawing ratio f is obtained in the case of non-slip contact between the drawing rollers (2)/(3) and the film (1) approximately from the ratio of the rates v2 and v1 of the rollers (3) and (2). The longitudinal drawing ratio f depends, among other things, on the starting material used. In the case of additional longitudinal drawing of biaxially oriented films, the longitudinal drawing factor is >1 to less than 5, preferably 1, 2 and 3. In the case of cast films or prefilms, the drawing factor varies between 2 and 7, preferably 3 and 5. Before drawing, the film is heated by means of heated rollers or by means of an atmospheric heating box. On reaching the drawing zone (14), the film (1) has assumed an elevated temperature TS, at which it can be drawn with the drawing ratio concerned. Depending on the raw material, film thickness, drawing rate and drawing ratio, the temperature TS during drawing is 5-40° C. below the melting point of the polymer concerned, preferably between 80 and 160° C. The drawing force FS is transferred by non-slip contact (adhesive friction) between the driven roller (2) and the film surface and the driven drawing rollers (3) onto the film (1). The force transfer is particularly effective, if the small fixing rolls exhibit a rubber coating, for example, with a rubber hardness of approximately 50 to 100 Shore hardness A.

If necessary, the drawing unit contains additional nip rollers which serve the purpose of further improving the non-slip contact between the film (1) and the drawing roller (2)/(3). The nip roller can be additionally arranged on the first slower and/or on the second more rapidly operating roller and driven itself or not be driven. The film (1) is gripped by the drawing roller (2)/(3) and the nip roller on both sides in such a way that it lies flat on the surface of the drawing roller (2)/(3) and a good non-slip contact is guaranteed.

The web speed $v_F$ of the film web (1) in the process according to the invention is determined by the desired processing speed. The usual web speeds amount to 1 to 1500 m/min, preferably 5 to 1000 m/min, depending on the type of material. For films of thermoplastic polymers, speeds of 10 to 500 m/min are commonly used.

Following longitudinal drawing according to the invention, the film is hemmed in the usual way and wound up. In general, the film is hemmed by the width of the peripheral area concerned. In individual cases, additional longitudinal drawing can be combined with further processing steps, e.g. a surface treatment by corona or flame or plasma.

The process according to the invention for additional longitudinal drawing is, basically, suitable for all films made of synthetic resins, in particular of thermoplastic synthetic resins. Films of thermoplastics synthetic resins are e.g. films of polyesters and polyolefins such as polyethylene, polypropylene, cycloolefins, polycarbonate, polyamides etc. Such films can have a single ply or multiple ply structure. The process is suitable in particular for biaxially drawn film webs of the above-mentioned materials with a thickness of 5 to 100 µm, preferably 2 to 80 µm. In particular, biaxially drawn polypropylene films with a thickness of 20 to 100 µm or undrawn polypropylene cast films with a thickness of >50 µm, in particular 80 to 200 µm, are preferred. Polypropylene films generally contain propylene homopolymers or propylene mixed polymers such as e.g. propylene-ethylene copolymer or ethylene-propylene-butylene terpolymer or a mixture of these propylene polymers in the layer or layers. The proportion of comonomer in the mixed polymers amounts to 1 to 10% by weight. These propylene polymers are usually used in boPP and PP cast films.

In general, biaxially drawn films have been longitudinally drawn during manufacture by a factor of 3-7 and transversely drawn by a factor of 5-10. Basically, both single ply as well as multi-ply embodiments can be subjected to addition longitudinal drawing. Biaxially drawn polypropylene films as such, processes for their manufacture and their composition are known to the expert.

For cast films or prefilms which are drawn according to the process of the invention, the thickness is in general 20 to 500 µm, preferably 30 to 200 µm. These thickness data obviously relate to he thickness of the films before they are longitudinally drawn according to the process.

The process according to the invention can be an integral part of the manufacturing process (in-line drawing in the longitudinal direction) or preferably be carried out in a separate operating step following manufacture and winding of the film.

Basically, the biaxially drawn starting material can be manufactured according to the usual known film manufacturing processes. In general, a flat film process with sequential longitudinal/transverse drawing is preferred. In principle, the film starting material can also be manufactured by means of the double bubble process. Such processes are known in the state of the art and described in numerous patent specifications and the specialist literature in great detail. Similarly, processes for the manufacture of a cast film are part of the knowledge of an expert.

The invention provides a simple way for fixing the film during drawing in the longitudinal direction. In this way, widthwise necking is prevented and the shrinkage properties in the transverse direction can be excellently controlled. The process according to the invention allows a film with a very high longitudinal shrinkage to be manufactured and to simultaneously maintain an excellent dimensional stability in the transverse direction. Consequently, the products made according to the process can be used in an excellent manner as all-round labels for encircling cylindrical containers, moulded bodies or articles of use.

EXAMPLE 1

A biaxially drawn polypropylene film was manufactured according to the stenter process. The film was built up single ply from polypropylene and had a thickness of 75 µm. The film was drawn longitudinally by a factor of 5 and transversely by a factor of 9 during its manufacture. After drawing, fixing of the film and subsequently winding took place. The film thus manufactured exhibited a shrinkage at 130° C./5 min in the circulating air oven of less than 3% in both directions.

This film was longitudinally drawn according to the process of claim 1. The film width amounted to approximately 490 mm before additional longitudinal drawing. Additional longitudinal drawing took place at a temperature of approximately 100 to 120° C. and with a drawing factor of 2.1. The film was fixed by contact pressing of the carriages (5a and 5b) in both peripheral areas during drawing.

In this way, a film web with an unhemmed width of approximately 400 mm was obtained. The film exhibited shrinkage values at 130° C./5 min of approximately 30% in the longitudinal direction and a negative transverse shrinkage (expansion) of 1.5%.

EXAMPLE 2

A biaxially drawn polypropylene film was produced according to the stenter process. The film was built up 3 ply from polypropylene and had a thickness of 61 µm. The base layer consisted essentially of propylene homopolymers. The top coat on both sides, having a thickness of approximately 1 µm each, consisted essentially of propylene-ethylene copolymers with an ethylene content of approximately 4.5% by weight. The film was transversely drawn longitudinally by a facto of 5 and transversely by a factor of 9 during it manufacture. After drawing, the film was fixed and subsequently wound. The film thus produced exhibited a shrinkage at 130° C./5 min in the circulating air oven of approximately 3% in both directions.

This film was additionally longitudinally drawn according to the process of claim 1. Before additional longitudinally drawing, the film width amounted to approximately 580 mm.

Additional longitudinal drawing took place at a temperature of approximately 90 to 110° C. and with a drawing factor of 1.3. The film was fixed by contact pressing of the carriages (5a and 5b) in both peripheral areas during drawing. In this example, the two carriages exhibited profiled fixing rolls which were covered with 4 O rings in each case (FIG. 9a and 9b). The carriages were positioned below and above the film web vis-à-vis each other in such a way that the indentations of the upper carriage faced the raised areas of the lower carriage such that the film exhibited a groove-like pattern in the peripheral area after additional longitudinal drawing.

In this way, a film web with a thickness of 48 μm and an unhemmed width of approximately 575 mm was obtained. The film exhibits shrinkage values at 130° C./5 min of approximately 24.5% in the longitudinal direction and a negative transverse shrinkage (expansion) of 0.4%.

EXAMPLE 3

An undrawn 3 ply polypropylene cast film was made according to the usual casting process by extrusion through a slit die. The film was 3 ply and had a thickness of approximately 150 μm. The top layers were approximately 30 μm thick each and consisted essentially of a propylene-ethylene copolymer with an ethylene content of approximately 2% by weight. The base coat consisted of a mixture of 45% by weight propylene homopolymer and 55% by weight propylene copolymer of the top layer. The film was not drawn while being produced. The film thus produced exhibited a shrinkage of approximately 0.5% in both directions at 150° C./5 min in the circulating air oven.

This film was longitudinally drawn according to the process of claim 1. The film width before longitudinal drawing was approximately 580 mm. Additional longitudinal drawing took place at a temperature of approximately 118° C. and with a drawing factor of 3.2. The film was fixed by contact pressing the carriage (5a) and (5b) in both peripheral areas during drawing. In this example, the two carriages exhibited profiled fixing rolls which were covered with 4 O rings (FIGS. 9a and 9b) in each case. The carriages were positioned below and above the film web in such a way vis-à-vis each other that the indentations of the upper carriage were situated opposite the raised areas of the lower carriage such that the film exhibited a groove-type pattern after longitudinal drawing in the peripheral area.

In this way, a film web with a thickness of 47 μm and an unhemmed width of approximately 570 mm was obtained. The film exhibited shrinkage values at 130° C./5 min of approximately 27% in the longitudinal direction and a negative transverse shrinkage (expansion) of 0.2%.

Shrinkage measurement:

The longitudinal and transverse shrinkage values relate to the length of the film before the shrinkage process Lo and Qo respectively. The test specimen is shrunk in a circulating air oven at a temperature of 130° C. for a period of 5 min. Subsequently, the remaining lengths and widths of the test specimen are determined as L1 and Q1. The change in length determined in comparison with the original length of the test specimen is indicated as the shrinkage in the longitudinal and transverse direction:

Longitudinal shrinkage: $Ls=(Lo-L_1)/Lo$

Transverse shrinkage: $Qs=(Qo-Q_1)/Qo$.

The invention claimed is:

1. Device for drawing a film web of thermoplastic polymer comprising a driven roller (2) driven at a speed of V1 and a second driven roller (3) driven at a speed of V2, V1<V2, and the rollers (2)/(3) being arranged in such a way that a drawing gap (4) is formed between the two rollers (2)/(3), and wherein between the two rollers (2)/(3), a width-maintaining device is arranged which mechanically grips peripheral areas of the film web in such a way that the width of the film web remains essentially unchanged during longitudinal drawing in the drawing gap (4), and wherein the width-maintaining device includes two pairs of carriages (5a) and (5b), one pair of carriages (5a) and (5b) being positioned on one film periphery and each of the four carriages having a plurality of rolls (6a) and (6b) arranged in sequence, one carriage being arranged on each film periphery above and one carriage opposite below the film web and the carriages (5a) and (5b) arranged above and below a film periphery being positioned vis-à-vis each other in such a way that the rolls (6a) and (6b) are aligned in the direction of advance (9) of the film and the pairs of rolls (6a) and (6b) lying opposite each other touching the film web lying inbetween in the peripheral area (10).

2. Device according to claim 1 characterised in that the length of the rolls corresponds approximately to the length of the drawing gap (4) such that the rolls (6) of the carriages (7) are arranged over the length of the drawing gap.

3. Device according to claim 1 characterised in that each carriage (5) has a double row arrangement of the rolls (6), the two rows of double rows being arranged displaced to each other such that the distance between contact points (8) with the film is halved compared with a single row arrangement of the same structural design.

4. Device according to claim 1 characterised in that the rolls (6) are freely rotatable.

5. Device according to claim 1 characterised in that the rolls (6) are equipped on their surface with a rubber or metal coating.

6. Device according to claim 1 characterised in that the carriages (5a) and (5b) are movable by means of a pressure cylinder away from the film web or towards the film web and that a fixing pressure of the pairs of rolls (6a) and (6b) situated above and below the film web are regulated via the pressure cylinder.

7. Device according to claim 1 characterised in that the rolls (6) are moveably connected with the carriages (5).

8. Device according to claim 7 characterised in that the rolls (6) are connected by a cylindrical slide bolt (12) with the carriage (5).

9. Device according to claim 8 characterised in that the rolls (6) are placed against a spring type pressure piece.

10. Device according to claim 1 characterised in that one carriage of each pair of carriages (5a) and (5b) additionally has a slide rail (15) such that a pair of carriages comprises a carriage with a slide rail (15) and a carriage without slide rail (15) which are positioned opposite each other above and below the film web.

11. Device according to claim 10 characterised in that the slide rail (15) is arranged in the area between the first roll in the drawing zone and the roller (2) and a second slide rail (15) is arranged between the last roll in the drawing zone and the second roller (3).

12. Device according to claim 10 characterised in that the slide rails have a tapering end towards the rolls (6) and towards the roller (2) and/or the second roller (3).

13. Device according to claim 11 characterised in that the carriages without slide rail (15) have additional rolls (18) situated opposite the slide rail (15).

14. Device according to claim 1 characterised in that the rolls (6) have a profiled surface.

15. Device according to claim 14 characterised in that the profiled rolls are covered with O rings of metal or rubber.

16. Device according to claim 14 characterised in that the surface of the rolls is profiled by engraving.

17. Device according to claim 16 characterised in that the rolls have a profiled rubber coating.

18. Process for longitudinal drawing of a film web by means of a device according to claim 1 characterised in that the film is first guided over the driven roller (2), subsequently passes through the drawing gap (4) and is then passed over the second driven roller (3), and wherein during drawing in the drawing gap (4) both peripheries of the film are fixed between the rolls (6) of the two pairs of carriages.

19. Process according to claim 18 characterised in that the film is drawn by means of a device according to claim 1.

20. Process according to claim 18 characterised in that a biaxially drawn film is drawn in the longitudinal direction.

21. Process according to claim 20 characterised in that the biaxially drawn film was drawn during its manufacture longitudinally by a factor in the region of 3 to 6 and transversely by a factor in the region of 5 to 12.

22. Process according to claim 21 characterised in that the film is drawn longitudinally with a factor of >1 to 5.

23. Process according to claim 20 characterised in that the film is a biaxially drawn polypropylene film which exhibits a thickness of 22 to 100 µm.

24. Process according to claim 18 wherein the film web is a cast film drawn in the longitudinal direction.

25. Process according to claim 18 wherein the film web is a prefilm drawn in the longitudinal direction.

26. Process according to claim 24 wherein the cast film drawn longitudinally by a factor of 2 to 7.

* * * * *